United States Patent
Jeong et al.

(10) Patent No.: US 12,251,983 B2
(45) Date of Patent: Mar. 18, 2025

(54) INTAKE AIR GUIDE DEVICE FOR A VEHICLE

(71) Applicants: HYUNDAI MOTOR COMPANY, Seoul (KR); KIA CORPORATION, Seoul (KR)

(72) Inventors: Ji Min Jeong, Seoul (KR); Chang Su Son, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 309 days.

(21) Appl. No.: 17/870,039

(22) Filed: Jul. 21, 2022

(65) Prior Publication Data
US 2023/0091511 A1 Mar. 23, 2023

(30) Foreign Application Priority Data
Sep. 23, 2021 (KR) .................. 10-2021-0125669

(51) Int. Cl.
*B60H 1/00* (2006.01)
*B62D 35/00* (2006.01)

(52) U.S. Cl.
CPC ......... *B60H 1/00021* (2013.01); *B62D 35/00* (2013.01)

(58) Field of Classification Search
CPC ...... B60H 1/00021; B60H 2001/00092; B60H 1/00521; B60H 1/00028; B60H 2001/00721; B62D 35/00; B60K 11/08
See application file for complete search history.

(56) References Cited

U.S. PATENT DOCUMENTS

| | | | |
|---|---|---|---|
| 10,391,858 B2 * | 8/2019 | Jeong | B60K 11/085 |
| 10,532,651 B2 * | 1/2020 | Dahl | B60K 11/085 |
| 11,945,285 B2 * | 4/2024 | Takeuchi | B60H 1/3457 |

FOREIGN PATENT DOCUMENTS

| | | | | |
|---|---|---|---|---|
| EP | 2332764 B1 | | 6/2013 | |
| EP | 2574484 B1 | * | 1/2017 | ........... B60K 11/085 |
| JP | 2593799 Y2 | * | 4/1993 | |
| JP | 2016088409 A | * | 5/2016 | |
| JP | 6801625 B2 | | 12/2020 | |
| JP | 6832272 B2 | | 2/2021 | |
| KR | 2021-0031058 A | | 3/2021 | |
| KR | 20210021819 A | * | 3/2021 | |
| WO | 2016/016549 A1 | | 2/2016 | |

OTHER PUBLICATIONS

KR-20210021819-A English Translation (Year: 2021).*
EP-2574484-B1 English Translation (Year: 2017).*
JP-2016088409-A English Translation (Year: 2016).*
JP-2593799-Y2 English Translation (Year: 1993).*

* cited by examiner

Primary Examiner — James A Shriver, II
Assistant Examiner — Michael T. Walsh
(74) Attorney, Agent, or Firm — MCDONNELL BOEHNEN HULBERT & BERGHOFF LLP

(57) ABSTRACT

An intake air guide device for a vehicle includes an air guide surrounding the outside of a heat exchanger mounted on a front portion of a vehicle and extending forward to guide an airflow so that the air flowing into the front portion of the vehicle flows into the heat exchanger, and a sealing guide extending backward from the front portion of the vehicle to surround the air guide in a state of being spaced apart from the outside, and extending inward or outward to overlap the air guide.

12 Claims, 4 Drawing Sheets

FIG. 4
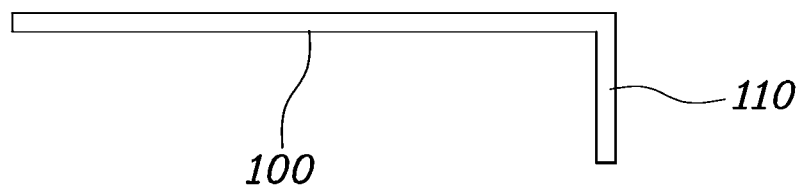

INTAKE AIR GUIDE DEVICE FOR A VEHICLE

CROSS REFERENCE TO RELATED APPLICATIONS

The present application claims priority of Korean Patent Application No. 10-2021-0125669 filed on Sep. 23, 2021, the entire contents of which is incorporated herein for all purposes by this reference.

BACKGROUND

Field of the Disclosure

The present disclosure relates to a technology of guiding air flowing into a grill of a vehicle to flow into a heat exchanger as an intake air guide device for a vehicle.

Description of the Related Art

Recently, a vehicle can be manufactured by integrally forming a grill on a front bumper, and external air can flow into the vehicle through the grill.

The air introduced into the vehicle from the outside can flow into a heat exchanger for the vehicle to cool the refrigerant in the heat exchanger or directly flow into the vehicle.

The heat exchanger can be a heat pump, a radiator, or a condenser depending on the type of vehicle.

Conventionally, to guide the air flowing into the vehicle through the grill to flow into the heat exchanger, the heat exchanger is disposed behind the grill, and an air guide that surrounds the outside of the heat exchanger and extends toward the grill is provided.

However, there is a problem in that the air introduced from the outside escapes into a space spaced between the air guide and the grill, thereby lowering the aerodynamic performance of the vehicle and the cooling performance of the heat exchanger.

The matters explained as the background art are for the purpose of enhancing the understanding of the background of the present disclosure and should not be taken as acknowledging that they correspond to the related art already known to those skilled in the art.

SUMMARY

The present disclosure is proposed to solve the above problem, and an object of the present disclosure is to guide the air flowing into a grill for a vehicle to flow into a heat exchanger, thereby improving the efficiency of the heat exchanger.

An intake air guide device for a vehicle according to the present disclosure includes an air guide surrounding the outside of a heat exchanger mounted behind a front portion of a vehicle and extending forward to guide an airflow so that the air flowing into the front portion of the vehicle flows into the heat exchanger, and a sealing guide extending backward from the front portion of the vehicle to surround the air guide in a state of being spaced apart from the outside, and extending inward or outward to overlap the air guide.

The air guide can include a first bent part bent to extend in a direction of crossing a direction of extending from the end thereof.

The first bent part can be vertically bent to extend toward the sealing guide.

The first bent part can be vertically bent to extend to a side opposite to the sealing guide.

The first bent part can be bent at a preset angle to extend in a direction in which the air guide extends.

The sealing guide can include a second bent part bent to extend in a direction of crossing a direction of extending from the end thereof.

The second bent part can be vertically bent to extend toward the air guide.

The second bent part can be vertically bent to extend to a side opposite to the air guide.

The second bent part can be bent at a preset angle to extend in a direction in which the sealing guide extends.

The air guide can include a first bent part bent to extend in a direction of crossing a direction of extending from the end thereof, the sealing guide can include a second bent part bent to extend in a direction of crossing a direction of extending from the end thereof, and the end of the first bent part and the end of the second bent part can be disposed at a preset distance.

The end of the air guide can be spaced apart from the front portion of the vehicle by a preset distance.

A spacing distance between the air guide and the sealing guide can be set within a preset range.

The intake air guide device for the vehicle according to the present disclosure can be provided with the air guide that surrounds the heat exchanger and extending toward the grill, and provided with the sealing guide that extends backward from the grill and surrounds the air guide to reduce the amount of leakage of the air introduced from the grill to the outside of the air guide through the sealing guide, thereby improving the performance of the heat exchanger and improving the aerodynamic performance of the vehicle.

In addition, the amount of leakage can be reduced, thereby reducing the noise generated during leakage.

BRIEF DESCRIPTION OF THE FIGURES

The above and other objects, features and other advantages of the present disclosure will be larger clearly understood from the following detailed description when taken in conjunction with the accompanying drawings, in which:

FIGS. 2, 3, and 4 are diagrams showing various exemplary embodiments of the intake air guide device for the vehicle according to the exemplary embodiment of the present disclosure.

DETAILED DESCRIPTION

Figure 1:
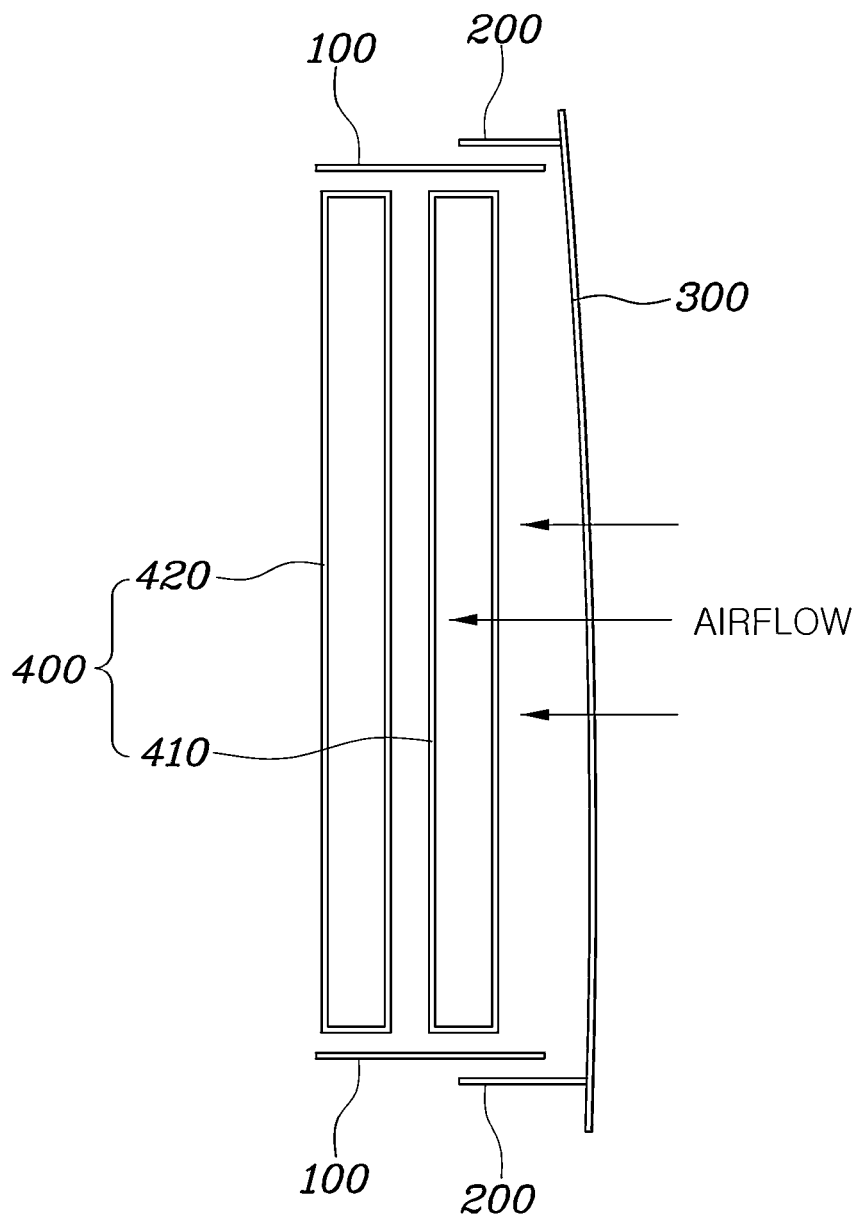
FIG. 1 is a plan cross-sectional diagram of an intake air guide device for a vehicle according to an exemplary embodiment of the present disclosure.

Specific structural to functional descriptions of the exemplary embodiments of the present disclosure disclosed in the present specification or application are only illustrated for the purpose of describing the exemplary embodiments according to the present disclosure, and the exemplary embodiments according to the present disclosure can be embodied in various forms and it should not be construed that the present disclosure is limited to the exemplary embodiments described in the present specification or application.

Since the exemplary embodiment according to the present disclosure can be variously changed and can have various forms, specific exemplary embodiments are shown in the drawings and described in detail in the present specification or application. However, this is not intended to limit the exemplary embodiment according to the concept of the present disclosure to a specific disclosed form, and should be understood to include all changes, equivalents, or substitutes included in the spirit and scope of the present disclosure.

Terms such as first and/or second can be used to describe various components, but the components should not be limited to the terms. The terms are used only for the purpose of distinguishing one component from another component, for example, without departing from the scope of the present disclosure, a first component can be referred to as a second component, and similarly, the second component can also be referred to as the first component.

When a certain component is said to be "connected" or "coupled" to another component, it can be directly connected or coupled to another component, but it should be understood that other components can also exist therebetween. On the other hand, when a certain component is said to be "directly connected" or "directly coupled" to another component, it should be understood that no other elements exist therebetween. Other expressions describing the relationship between components, that is, "between" and "directly between" or "neighboring to", "directly neighboring to", etc. should also be interpreted in the same manner.

The terms used in the present specification are used only to describe a specific exemplary embodiment, and are not intended to limit the present disclosure. The singular expression includes the plural expression unless the context clearly described otherwise. In the present specification, it should be understood that terms such as "comprise" or "have" specifies the presence of the embodied feature, number, step, operation, component, part, or a combination thereof, but does not exclude the presence or addition possibility of one or more other features, numbers, steps, operations, components, parts, or combinations thereof in advance.

Unless defined otherwise, all terms including technical or scientific terms used herein have the same meaning as commonly understood by those skilled in the art to which the present disclosure pertains. The terms defined in the dictionary commonly used should be interpreted as having a meaning consistent with the meaning in the context of the related technology, and cannot be interpreted as an ideal or excessively formal meaning, unless clearly defined in the present specification unless clearly defined in the present specification.

Hereinafter, the present disclosure will be described in detail by describing preferred exemplary embodiments of the present disclosure with reference to the accompanying drawings. The same reference numerals presented in each drawing indicate the same members.

Figure 2:
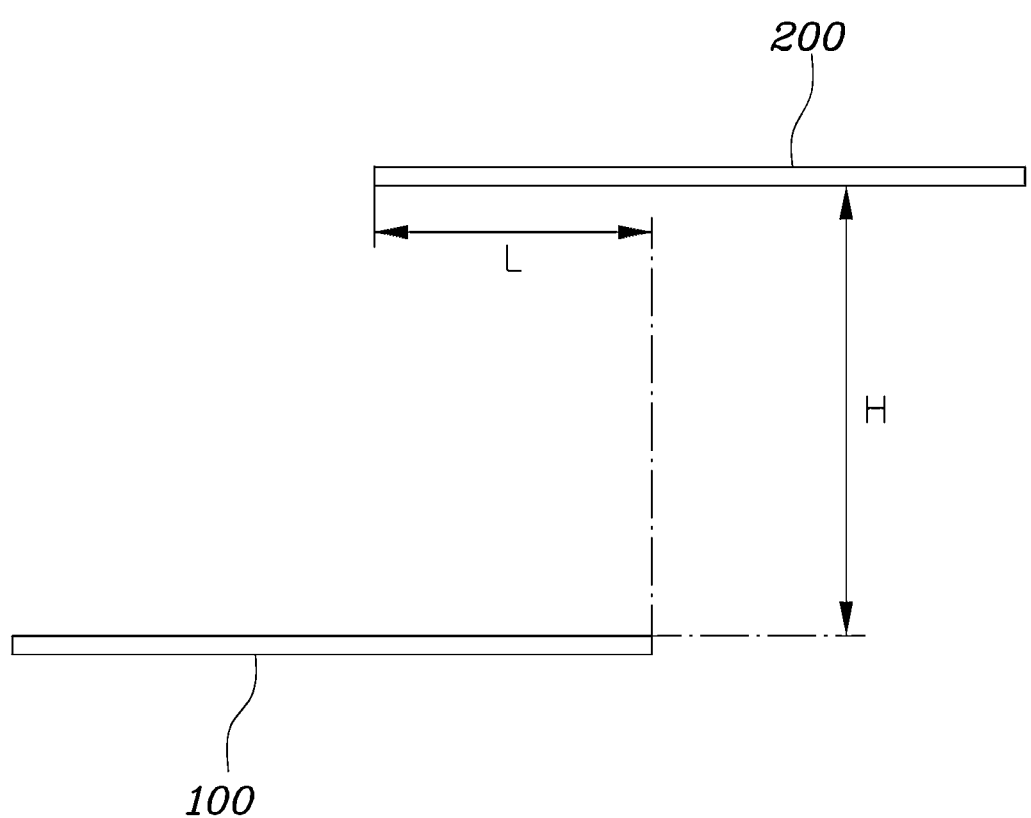
Figure 3:
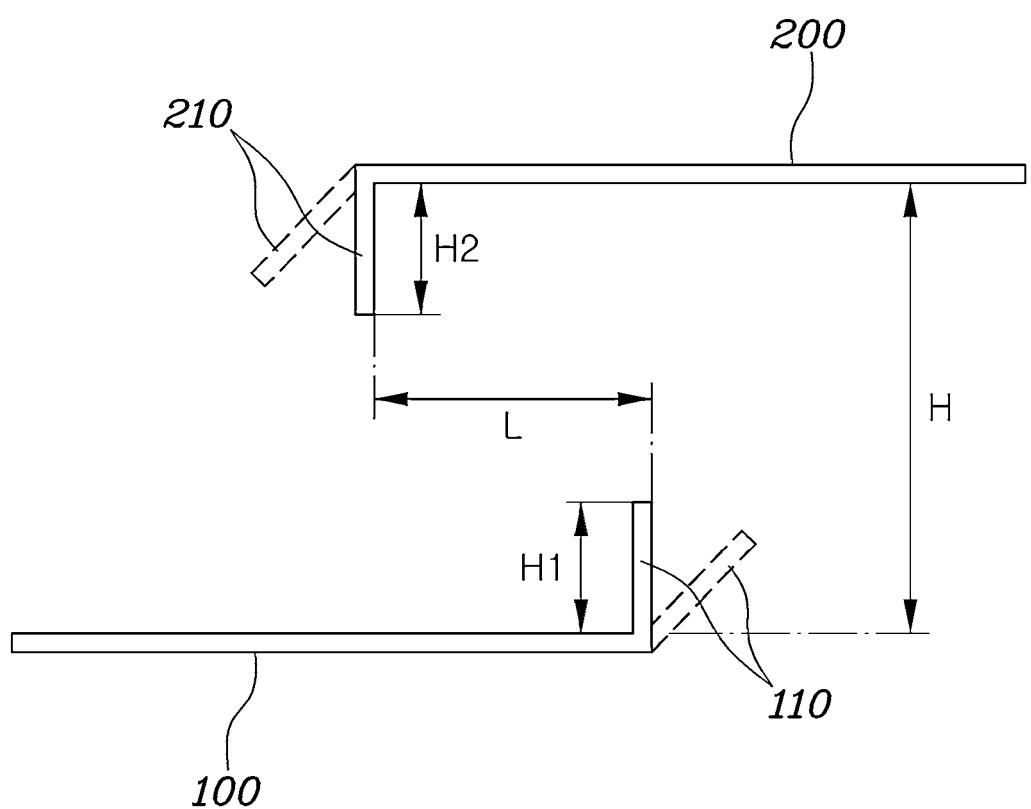

FIG. 1 is a plan cross-sectional diagram of an intake air guide device for a vehicle according to an exemplary embodiment of the present disclosure, and FIGS. 2 to 4 are diagrams showing various exemplary embodiments of the intake air guide device for the vehicle according to the exemplary embodiment of the present disclosure.

An intake air guide device for a vehicle according to a preferred exemplary embodiment of the present disclosure will be described with reference to FIGS. 1 to 4.

An intake air guide device for a vehicle according to the present disclosure specifically includes an air guide 100 surrounding the outside of a heat exchanger 400 mounted behind a front portion of the vehicle and extending forward to guide airflow so that the air flowing into the front portion of the vehicle flows into the heat exchanger 400, and a sealing guide 200 extending backward from the front portion of the vehicle to surround the air guide 100 in a state of being spaced apart from the outside and extending inward or outward to overlap with the air guide 100.

Recently, a vehicle can be manufactured by integrally forming a grill 300 on the front portion thereof, and external air can flow into the vehicle through the grill 300.

The air flowing into the vehicle from the outside can flow into the heat exchanger 400 for the vehicle to cool the refrigerant in the heat exchanger 400 or can directly flow into the vehicle.

The heat exchanger 400 can be a heat pump, a radiator 420, a condenser 410, etc. depending on the type of the vehicle, and both the radiator 420 and the condenser are shown in FIG. 1 of the present disclosure but can be changed depending upon the type of the vehicle.

Conventionally, to guide the air flowing into the vehicle through the grill 300 to flow into the heat exchanger 400, the heat exchanger 400 is disposed behind the grill 300, and the air guide 100 that surrounds the outside of the heat exchanger 400 and extends toward the grill 300 is provided.

However, the air introduced into a space spaced between the air guide 100 and the grill 300 from the outside escapes, thereby lowering the aerodynamic performance of the vehicle and the cooling performance of the heat exchanger 400.

To solve these problems, according to the present disclosure, a sealing guide 200 that extends from the rear of the grill 300 toward the heat exchanger 400 can be provided.

As shown in FIG. 2, the air guide 100 and the sealing guide 200 can be designed so that their ends overlap each other by a preset distance (L).

The preset distance (L) can be set as 0 to 10 mm so that the air guide 100 and the sealing guide 200 can overlap each other, and the preset distance (L) can be set by a designer.

The air guide 100 can surround the outside of the heat exchanger 400 to induce the air flowing into the grill 300 to flow into the heat exchanger 400, and the sealing guide 200 can surround the outside of the air guide 100 and seal all of the air not flowing into the air guide 100 so that more air can flow into the air guide 100.

Therefore, it is possible to seal the leakage occurring on the end side of the air guide 100, thereby reducing the leakage and improving the aerodynamic performance of the vehicle.

The air guide 100 can include a first bent part 110 bent and extending in a direction of crossing the direction of extending from the end thereof.

FIG. 3 is a diagram showing the cross sections of the air guide 100 and the sealing guide 200, and in FIG. 3, the first bent part 110 is shown in a shape bent toward the sealing guide 200.

As shown in FIG. 3, the air guide 100 can be formed with the first bent part 110 having the end bent toward the sealing guide 200, and the end of the first bent part 110 can be formed not to be in contact with the sealing guide 200.

It is possible to reduce a spacing distance between the air guide 100 and the sealing guide 200 by forming the first bent part 110, and to reduce the amount of air that the air introduced from the grill 300 of the front portion of the vehicle is leaked to the outside of the air guide 100 without flowing into the heat exchanger 400 through the air guide 100.

In addition, as the exemplary embodiment of the present disclosure, the distance between the end of the first bent part 110 and the sealing guide 200 can be set within 5 to 10 mm.

Therefore, it is possible to reduce the leakage amount of the air leaked to the outside of the air guide 100 and to improve the aerodynamic performance of the vehicle.

The first bent part 110 can be vertically bent to extend toward the sealing guide 200.

As shown in FIG. 3, as a first exemplary embodiment of the first bent part 110, the first bent part 110 can be formed to be bent vertically to extend from the end of the air guide 100 toward the sealing guide 200.

Therefore, it is easy to set a preset range between the air guide 100 and the sealing guide 200, and it is also possible to simplify the manufacturing process by vertically manufacturing the first bent part 110.

The first bent part 110 can be bent at the preset angle to extend in the direction in which the air guide 100 extends.

As a second exemplary embodiment of the first bent part 110, as shown in FIG. 3, the first bent part 110 can be set to be bent at the preset angle to extend from the end from which the air guide 100 extends toward the sealing guide 200. The preset angle of the first bent part 110 can be set as 45° to 90°.

Therefore, the first bent part 110 can be formed to be bent at the preset angle, and a part of a space between the air guide 100 and the sealing guide 200 can be sealed through the first bent part 110, thereby reducing the leakage of the air.

The first bent part 110 can be vertically bent to extend to the side opposite to the sealing guide 200.

As a third exemplary embodiment of the first bent part 110, as shown in FIG. 4, the first bent part 110 can be set to be bent to extend from the direction in which the air guide 100 extends in the opposite direction of the sealing guide 200.

In addition, it is possible to reduce the noise of the leaked air by guiding the flow direction of the leaked air.

A length of the first bent part 110 according to the third exemplary embodiment can be the same as or shorter than the length of the first bent part 110 according to the first exemplary embodiment.

Therefore, as the first bent part 110 is formed to be bent from the end of the air guide 100 in the opposite direction of the sealing guide 200, it is possible to flow the air not flowing into the air guide 100 into the sealing guide 200 side, thereby improving the aerodynamic performance of the vehicle.

The sealing guide 200 can include a second bent part 210 that is bent to extend in a direction of crossing the direction of extending from the end thereof.

As shown in FIGS. 3 and 4, the end of the sealing guide 200 can be formed to be bent in the direction of crossing the direction in which the sealing guide 200 extends.

FIG. 3 is a diagram showing the cross sections of the air guide 100 and the sealing guide 200 and in FIG. 3, the second bent part 210 is shown in a shape bent toward the air guide 100.

As shown in FIG. 3, the sealing guide 200 can be formed with the second bent part 210 having the end bent toward the sealing guide 200, and the end of the second bent part 210 can be formed not to be in contact with the air guide 100.

It is possible to reduce the spacing distance between the air guide 100 and the sealing guide 200 by forming the second bent part 210, and to reduce the amount of air that the air introduced from the grill 300 of the front portion of the vehicle is leaked to the outside of the air guide 100 to flow into the sealing guide 200 side without flowing into the heat exchanger 400 through the air guide 100.

In addition, as the exemplary embodiment of the present disclosure, the distance between the end of the second bent part 210 and the air guide 100 can be set within 5 to 10 mm.

Therefore, it is possible to reduce the leakage amount of the air leaked to the outside of the air guide 100 and to improve the aerodynamic performance of the vehicle.

In addition, as the amount of leakage is reduced, the amount of the air flowing into the heat exchanger 400 can increase, thereby increasing the efficiency of the heat exchanger 400.

The second bent part 210 can be vertically bent to extend toward the air guide 100.

As shown in FIG. 3, as the first exemplary embodiment of the second bent part 210, the second bent part 210 can be formed to be bent vertically to extend from the end of the sealing guide 200 toward the air guide 100.

Therefore, it is easy to set a preset range between the air guide 100 and the sealing guide 200, and it is also possible to simplify the manufacturing process by vertically manufacturing the second bent part 210.

In addition, as the second bent part 210 reduces the amount of the air leaked between the sealing guide 200 and the air guide 100, it is possible to increase the amount of the air flowing into the air guide 100, thereby improving the cooling performance of the heat exchanger 400.

The second bent part 210 can be bent at a predetermined angle to extend in the direction in which the sealing guide 200 extends.

As the second embodiment of the second bent part 210, as shown in FIG. 3, the second bent part 210 can be set to be bent at a preset angle to extend from the end from which the sealing guide 200 extends toward the air guide 100 toward the air guide 100. The preset angle of the second bent part 210 can be set as 45° to 90°.

Therefore, the second bent part 210 can be formed to be bent at the preset angle, and a part of the space between the air guide 100 and the sealing guide 200 can be sealed through the second bent part 210, thereby reducing the leakage of the air.

In addition, as the second bent part 210 reduces the amount of the air leaked between the sealing guide 200 and the air guide 100, it is possible to increase the amount of the air flowing into the air guide 100, thereby improving the cooling performance of the heat exchanger 400.

The second bent part 210 can be vertically bent to extend to the side opposite to the air guide 100.

As a third exemplary embodiment of the first bent part 110, as shown in FIG. 4, the first bent part 110 can be set to be bent to extend from the direction in which the air guide 100 extends in the opposite direction of the sealing guide 200.

The length of the third exemplary embodiment of the second bent part 210 can be formed to be the same as or shorter than the length of the first exemplary embodiment.

Therefore, as the second bent part 210 is formed to be bent from the end of the sealing guide 200 in the opposite direction of the air guide 100, it is possible to flow the air leaked into the outside of the air guide 100 to the outside of the sealing guide 200, thereby improving the aerodynamic performance of the vehicle.

In addition, it is possible to reduce the noise of the leaked air by guiding the flow direction of the leaked air.

The length of the third exemplary embodiment of the second bent part 210 can be formed to be the same as or shorter than the length of the first exemplary embodiment.

The air guide 100 can include the first bent part 110 bent to extend in the direction of crossing the direction of extending from the end thereof, the sealing guide 200 can include the second bent part 210 bent to extend in the direction of crossing the direction of extending from the end thereof, and the end of the first bent part 110 and the end of the second bent part 210 can be disposed at a preset distance.

The first bent part 110 and the second bent part 210 described above can be simultaneously applied, and a vertical distance (H-H2-H1) between the end of the first bent part 110 and the end of the second bent part 210 can be set as 5 to 10 mm.

Therefore, the first bent part 110 and the second bent part 210 can be simultaneously applied, thereby minimizing the amount of the air leaked to the outside of the air guide 100 to improve the cooling performance of the heat exchanger 400.

The end of the air guide 100 can be spaced apart from the front portion of the vehicle by a preset distance.

As shown in FIG. 1, the end of the air guide 100 can be set to be spaced apart from the grill 300 positioned on the front portion of the vehicle by the preset distance. Therefore, it is possible to prevent the air guide 100 from being damaged by contacting the air guide 100 due to the manufacturing error when the grill 300 of the vehicle is mounted, and in addition, some air are leaked to the outside of the air guide 100 and therefore, the air can flow between the sealing guide 200 and the air guide 100, thereby improving the aerodynamic performance of the vehicle.

The spacing distance between the air guide 100 and the sealing guide 200 can be set within the preset range.

As shown in FIG. 2, the air guide 100 and the sealing guide 200 can overlap each other in an extending direction, and can be formed to be spaced apart from each other by the preset distance.

As the exemplary embodiment of the present disclosure, the distance between the air guide 100 and the sealing guide 200 can be set as 5 to 10 mm, and it is possible to improve the aerodynamic performance of the vehicle through this spacing distance, and to reduce the amount of the air leaked to the outside of the air guide 100, thereby reducing the noise and fan noise caused by the leakage of the air.

While the specific exemplary embodiments of the present disclosure have been shown and described, it will be apparent to those skilled in the art that the present disclosure can be variously improved and changed without departing from the technical spirit of the present disclosure provided by the appended claims.

The invention claimed is:

1. An intake air guide device for a vehicle comprising:
an air guide surrounding an outside of a heat exchanger mounted on a front portion of a vehicle, the air guide extending forward to guide an airflow so that the air flowing into the front portion of the vehicle flows into the heat exchanger; and
a sealing guide extending backward from the front portion of the vehicle to be spaced apart from the air guide and surrounding the air guide on an outside of the air guide, the sealing guide extending to overlap the air guide.

2. The intake air guide device of claim 1, wherein the air guide comprises a first bent part extending at a non-zero angle from one end of the air guide.

3. The intake air guide device of claim 2, wherein the first bent part is vertically bent to extend toward the sealing guide.

4. The intake air guide device of claim 2, wherein the first bent part is vertically bent to extend to a side opposite the sealing guide.

5. The intake air guide device of claim 2, wherein the first bent part is bent at a preset angle to extend in a direction in which the air guide extends.

6. The intake air guide device of claim 1, wherein the sealing guide comprises a second bent part extending at a non-zero angle from one end of the sealing guide.

7. The intake air guide device of claim 6, wherein the second bent part is vertically bent to extend toward the air guide.

8. The intake air guide device of claim 6, wherein the second bent part is vertically bent to extend to a side opposite the air guide.

9. The intake air guide device of claim 6, wherein the second bent part is bent at a preset angle to extend in a direction in which the sealing guide extends.

10. The intake air guide device of claim 1, wherein the one end of the air guide that extends forward is spaced apart from the front portion of the vehicle by a preset distance.

11. The intake air guide device of claim 1, wherein the air guide comprises a first bent part extending at a non-zero angle from one end of the air guide, the sealing guide comprises a second bent part extending at a non-zero angle from one end of the sealing guide, and an end of the first bent part and an end of the second bent part are positioned at a preset distance apart in a vertical direction.

12. The intake air guide device of claim 1, wherein the air guide and the sealing guide are spaced apart in a vertical direction so that a distance between the air guide and the sealing guide is within a preset range.

* * * * *